United States Patent [19]

Poulain

[11] Patent Number: 5,611,691
[45] Date of Patent: Mar. 18, 1997

[54] MODULAR CONSTRUCTION KIT USING ELECTRONIC CONTROL MODULES

[75] Inventor: Bernard Poulain, Nice, France

[73] Assignee: Serge A. Atlan, Nice, France; a part interest

[21] Appl. No.: 373,363

[22] Filed: Jan. 17, 1995

[51] Int. Cl.[6] ...................................................... G09B 9/00
[52] U.S. Cl. ........................ 434/224; 434/219; 434/338; 434/379
[58] Field of Search ................................... 434/219, 224, 434/338, 339, 340, 341, 343, 345, 379

[56] References Cited

U.S. PATENT DOCUMENTS

| | | | |
|---|---|---|---|
| 4,464,120 | 8/1984 | Jensen | 434/201 |
| 4,696,647 | 9/1987 | Ahmad | 434/224 |
| 4,776,798 | 10/1988 | Crawford | 434/224 |

Primary Examiner—Jerome Donnelly
Assistant Examiner—Glenn E. Richman
Attorney, Agent, or Firm—Ezra Sutton

[57] ABSTRACT

The present invention provides a modular electronic construction kit having modular control circuit boards or modules capable of achieving various types of electrical control for controlling movement of mechanical elements and the like. Each module includes cut-out plastic or metal templates to accommodate the introduction of a modular integrated electronic circuit board(s). A printed self-adhesive label is placed on the cut-out plastic or metal template. The printed labels represent the coded symbols for identification of the modular integrated circuit boards, including their functions and their electrical connections. In the preferred embodiment, the kit has a minimum of 6 different and numbered basic modules, but the kit may include up to 30 different modules which are intended for the optimization of complex control circuits. All of the modular circuit boards are electrically compatible with each other.

6 Claims, 14 Drawing Sheets

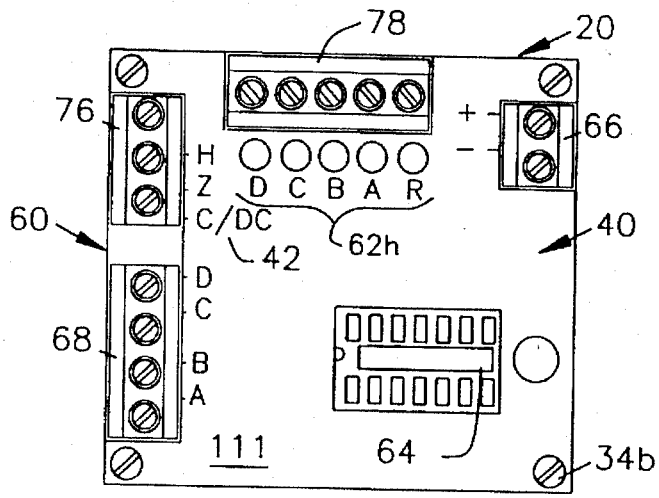
FIG. 22
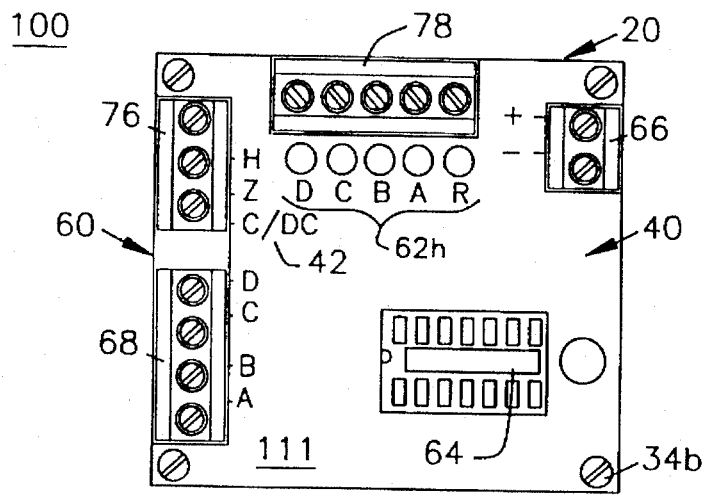
FIG. 23
FIG. 24
| D | C | B | A | R | Dec |
|---|---|---|---|---|---|
| 0 | 0 | 0 | 0 | X | 0 |
| 0 | 0 | 0 | 1 | X | 1 |
| 0 | 0 | 1 | 0 | X | 2 |
| 0 | 0 | 1 | 1 | X | 3 |
| 0 | 1 | 0 | 0 | X | 4 |
| 0 | 1 | 0 | 1 | X | 5 |
| 0 | 1 | 1 | 0 | X | 6 |
| 0 | 1 | 1 | 1 | X | 7 |
| 1 | 0 | 0 | 0 | X | 8 |
| 1 | 0 | 0 | 1 | X | 9 |

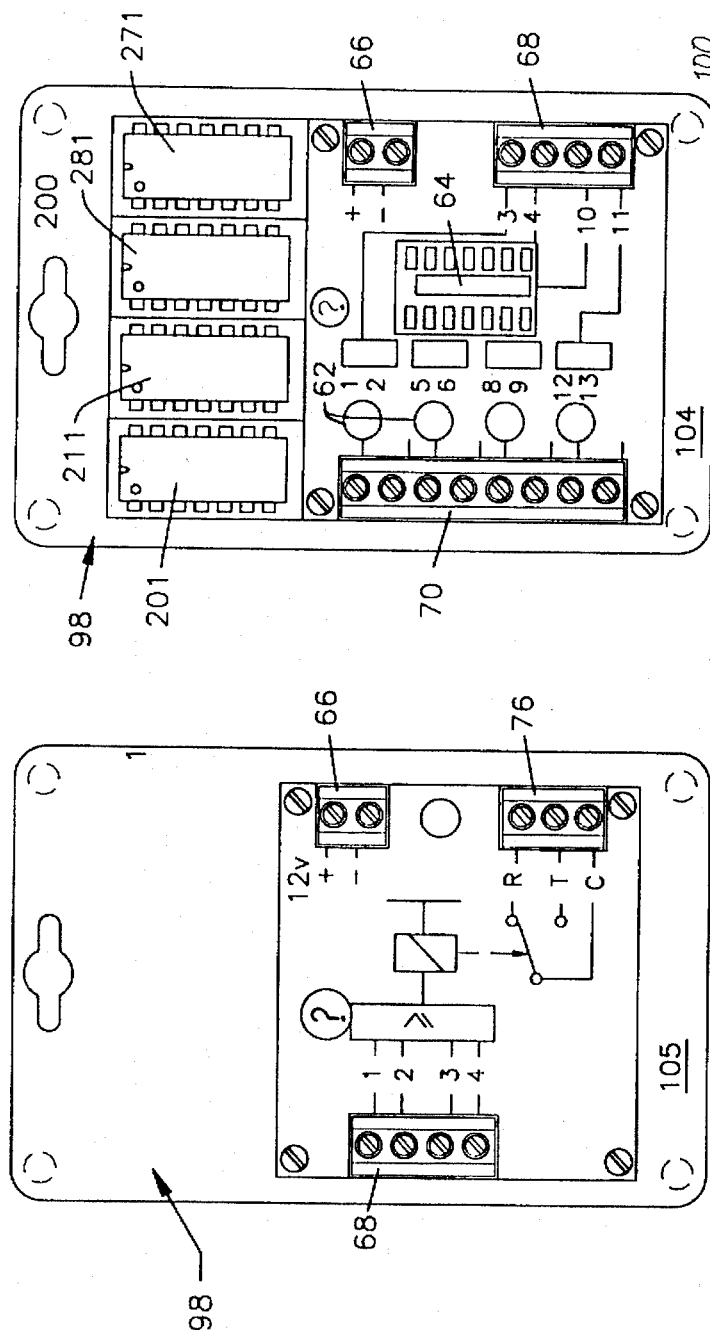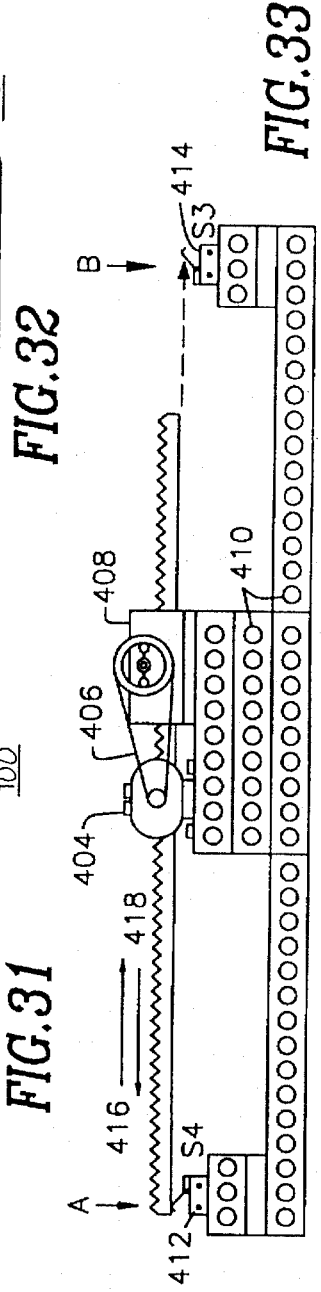
FIG.32
FIG.31
FIG.33

MODULAR CONSTRUCTION KIT USING ELECTRONIC CONTROL MODULES

FIELD OF THE INVENTION

The invention relates to a child's toy being a modular electronic construction kit intended for electrical control, and more particularly, the kit is especially intended for the electrical control of technical construction kits, construction models, scale models, and for breadboarding of animation visuals.

BACKGROUND OF THE INVENTION

At present, the assembly of electronic boards to allow children as young as nine years old to achieve the electric control of modular construction kits, scale models, and construction models are available in the market for children's use and play. Most construction kits, like LEGO, MECCANO, and other technical kits, are intended to teach children while playing or studying to better understand the mechanisms of machines, such as erection cranes, elevators, railroad crossing safety guards, small robots, trucks and cars, and the like. These machines are based on modular plastic elements with transmission and movement transformation mechanisms, such as a gear, cogwheel belt, pulley, etc., intended for their machine animations. Most of these construction kits may have their mechanisms animated, either manually or with small electric motors.

The benefit for a child is to construct a construction model or a scale model, which enables the child to reproduce, on a smaller scale, an authentic design of what exists in real life, including actual shapes and movements. At the present time, in order to animate a model, the child can use the following three means of animation.

The simplest means of animation is where the child animates manually the mobile mechanical elements of the model to give it a semblance of realism.

In the second means of animation, which gives more realism to the movement of the mechanical elements of the model, the child may install a small electric motor, which the child controls through push buttons.

In the third means of animation, which appears to be more high tech or high performance, the child may use a microcomputer with a software disc to control the small electric motors which will operate the mechanical movements of the model according to the three axes of movement, being X, Y, and Z.

The main problem with the aforementioned children's construction kits is that the manual operation and/or the operation by a small electric motor controlled by push buttons of the model is at a most basic level and usually is of limited interest to the child and is without much educational value to the child after a few times of play. On the other extreme, the use of a computer is financially disproportionate and far too complex and has limited educational value to the child who operates a small electric motor of the construction kit for play. The play aspect of a child using a software disc will always tend to make the child believe that it is easy with a computer to conceive an electromechanical automation, but this is incorrect.

It would be preferable that a child have the possibility of acquiring a hands-on know-how, a general knowledge, and a high performance material means (such as logic control modules) that is simple to use and less costly to buy for the child. It would be desirable to allow the child to conceive and learn progressively the systems of electromechanical control by establishing logical algorithms of the motorizations. Thus, the child may construct several independent electrical control systems and be interactive with them, and this can be done more easily than with computers, at least, for rather simple machine design achievements by the child. It would be highly desirable to provide a child's modular construction kit having electrical controls which utilize current electronic technology, thus making it possible to remedy the aforementioned drawbacks.

Accordingly, it is an object of the present invention to provide a modular construction kit having electrical modular controls for controlling and/or building scale models and construction models, and for the use of breadboarding animation visuals for the play and learning skills of the children involved.

Another object of the present invention is to provide for the utilization of current electronic technology for adaptation to a child's modular construction kit having electronic modular controls.

Another object of the present invention is to provide for the use of logic modules that are designed for processing information data from sensors which are electromechanical and optoelectronic in use.

Another object of the present invention is to provide for the use of analog modules that are designed for processing analog physical parameters, such as the intensity of a light source and the levels of temperature, pressure, liquids, potentiometers, etc.

Other objects of the present invention are to provide electronic modular control boards which are used for the sensing of power (presence or absence), sensor switches, and indicator lights for simulation and the adjustment of a control; combinational and sequential logic; time-filling devices; output relay interfaces for controlling motors, lamps, pumps, etc.; monostable oscillators to transform a continuous signal into movement; and digital control counters to count objects or to control movements of a mobile model.

Another object of the present invention is to provide a modular construction kit for a child to acquire a hands-on know-how and general knowledge by using high-performance logic control modules that are simple to use and learn from.

Another object of the present invention is to provide a modular construction kit having modular control boards that are reliable and permanently reusable for various applications.

Another object of the present invention is to provide a modular construction kit having modular control boards that have minimal breakdown risk and do not require any maintenance.

Another object of the present invention is to provide a modular construction kit having modular control boards which can be modified at all times to change an electric control by adding or withdrawing control boards.

Another object of the present invention is to provide a modular construction kit having modular control boards that can be used to form a plurality of different subassemblies of electric controls and which can be used to make simple and/or complex electric controls for mechanical movements.

Another object of the present invention is to provide a modular construction kit having modular control boards which can be interactive with other types of construction kits, scale models, construction models, and the like.

Another object of the present invention is to provide a modular construction kit having a self-training utilization guide explaining the procedures of implementation of the modules with data sheets proposing diagram suggestions of electric controls which will help the child in the selection of modules to automate the mobile elements of the model.

Another object of the present invention is to provide a modular construction kit capable of providing the controls for a variety of different scale models, construction models, and animation visuals of objects like a drawbridge, a railroad crossing guard, an automobile, a truck, a small robot, an elevator, an erection crane, and the like.

A further object of the present invention is to provide a modular construction kit capable of being upgraded to 30 different modules that are intended for the optimization of complex control circuits which increase the types of models that are constructed and controlled.

A still further object of the present invention is to provide a modular construction kit having electronic controls which can be mass produced in an automated and economical manner and are relatively inexpensive.

SUMMARY OF THE INVENTION

The present invention provides a modular electronic construction kit having modular control circuit boards or modules capable of achieving various types of electrical control that can be simple and/or complex electric controls for controlling movement of mechanical elements and the like.

The modular electronic construction game of the present invention is in the form of a kit having small molded plastic modules of various colors in which the electronic circuit boards are enclosed. Each module includes cut-out plastic or metal templates to accommodate the introduction of a modular integrated electronic circuit board(s). A printed self-adhesive label is placed on the cut-out plastic or metal template. The printed labels represent the coded symbols for identification of the modular integrated circuit boards, including their functions and their electrical connections. The electrical connections are located on the sides of the modular circuit boards and are provided by wiring on miniature sockets or screw-on type terminal blocks according to the style of the model selected.

In the preferred embodiment, the kit has a minimum of 6 different and numbered basic modules, but the kit may include up to 30 different modules which are intended for the optimization of complex control circuits. As a common factor within the kit, the models are utilized with or associated with other types of different modules or utilized with the same type of module. All of the modular circuit boards are electrically compatible with each other, and their wiring is achieved according to an alphanumeric code.

The functions of the principal modular circuit boards of the present invention include the following: a check of logic conditions; simulation and the adjustment of a control; an adjustable time-delay device; motor control movement; a countdown counter; and a control for mobile movements of a vehicle. All of the logic modules that are designed for this kit are for processing information from sensors which are electromechanical or optoelectronic in use. The analog modules that are designed for this kit are for processing analogs of physical sizes or functional parameters, such as intensity of a light source; temperature, pressure, or liquid levels; electrical energy; and the like. The functional identification of the modules or modular circuit boards is achieved according to a given sequential number. A manual is provided to the user having either index cards or blue-print sheets of the electrical diagrams which guides the user to a selection of a circuit board for a specific functional need (i.e., the opening and closing of a scale model drawbridge).

BRIEF DESCRIPTION OF THE DRAWINGS

Further objects, features, and advantages of the present invention will become apparent upon consideration of the detailed description of the presently-preferred embodiments, when taken in conjunction with the accompanying drawings, wherein:

FIG. 22 is a top plan view of module No. 11 showing the configuration of the circuits and component parts thereon;

FIG. 23 is a top plan view of module No. 12 showing the configuration of the circuits and component parts thereon;

FIG. 24 is a diagram of the binary code matrix used for counting and/or counting down in module No. 11 of FIG. 22 and module No. 12 of FIG. 23;

FIG. 31 is a top plan view of a transparent plastic blister package containing a module No. 5 circuit board;

FIG. 32 is a top plan view of a transparent plastic blister package containing a module No. 4 circuit board having 4 integrated circuit connectors;

FIG. 33 is a side elevational view of a scale model drawbridge showing the movement of a bridge closing;

DETAILED DESCRIPTION OF THE PREFERRED EMBODIMENTS

Figure 2:
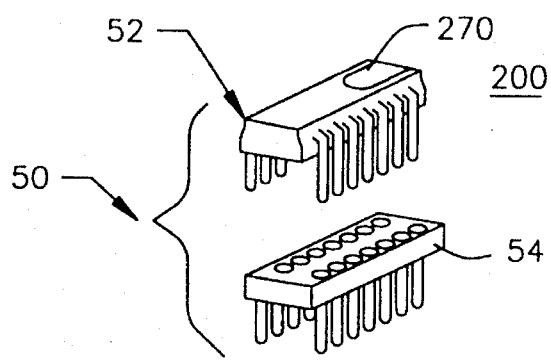
FIG. 2 is a perspective view of the preferred embodiment showing an integrated circuit connector being inserted into a pluggable circuit holder.

The children's toy in the form of a modular construction toy or kit 10, using a series of electronic control modules 100 and their component parts of the primary and secondary embodiments of the present invention, are represented in FIGS. 1 through 35. The modular construction kit 10 is provided to the user in the form of a kit 10 having a plurality of modules 100 having the following major components: a plastic template 20 having a plurality of rectangular cut outs and circular hole openings; a self-adhesive plastic colored label 40; an integrated circuit and holder component 50; a circuit board 60 having various passive and active electronic components thereon for a specific activity and/or function; a plastic counter top and ground plate 80; and a board holder 90. (See FIG. 34.)

Figure 1:
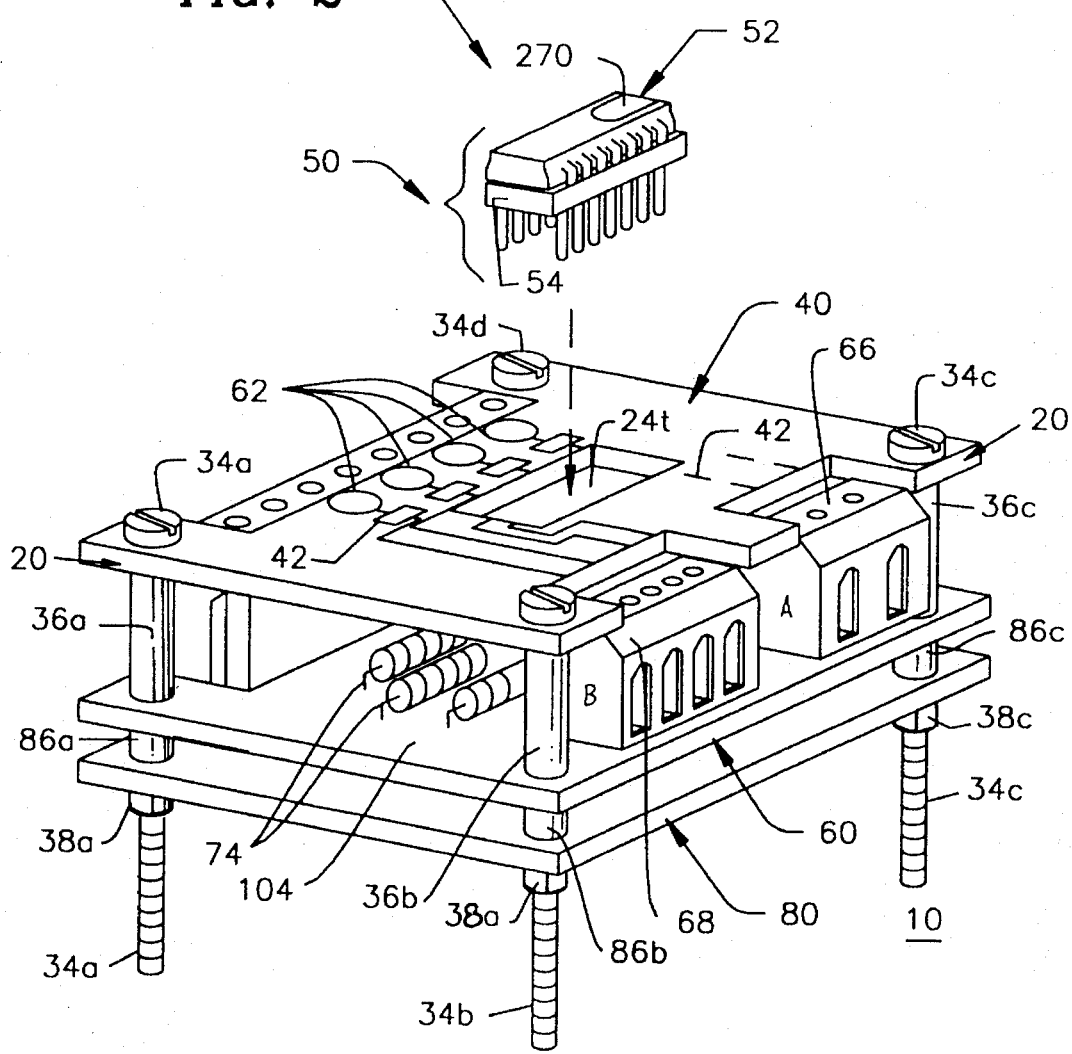
FIG. 1 is a perspective view of the preferred embodiment of the present invention showing the modular electronic construction game in the form of a kit having functional modules with modular control circuit boards.
Figure 3:
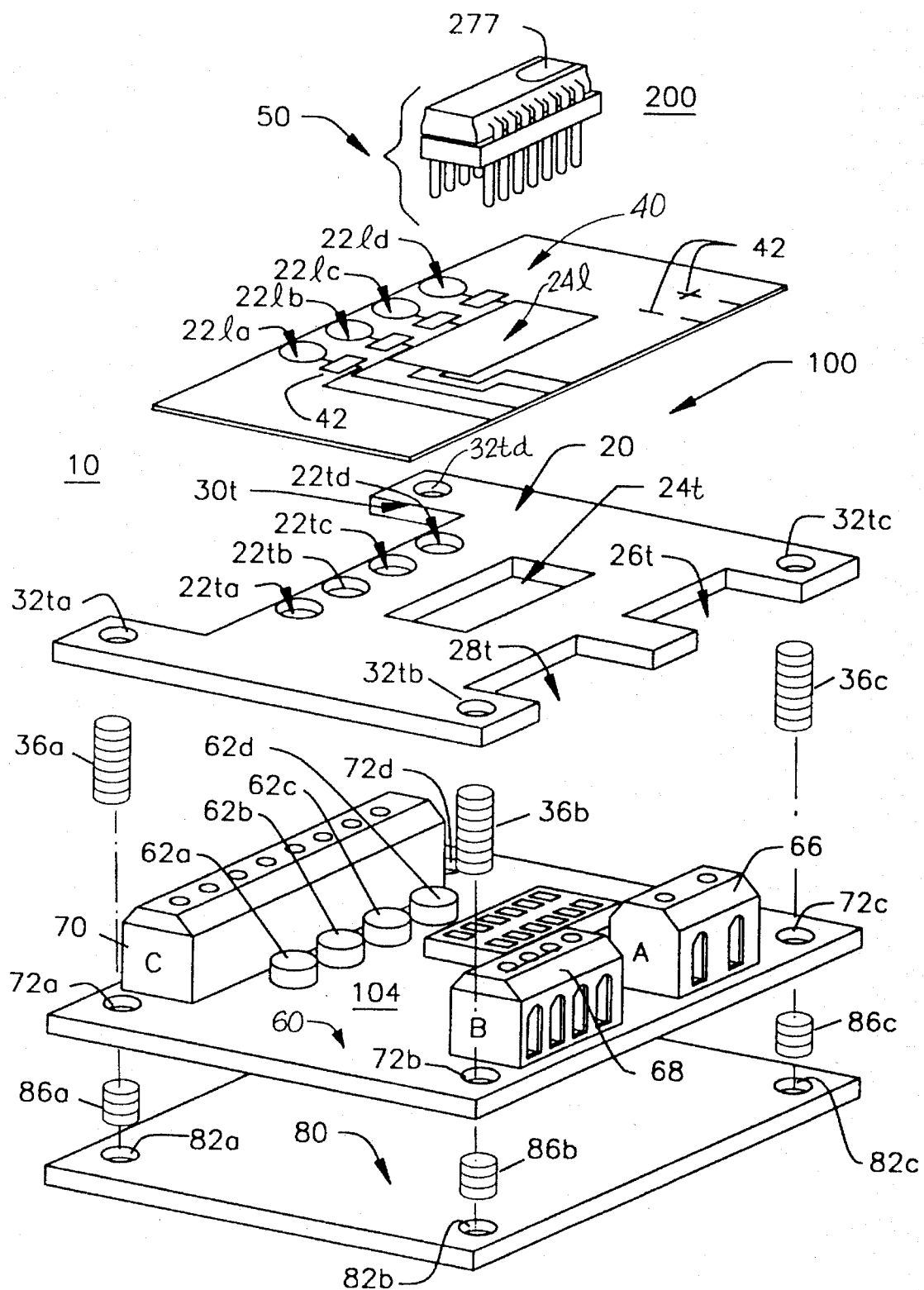
FIG. 3 is an exploded perspective view of the preferred embodiment showing the primary components of an electronic control module.

These primary components of kit 10 are depicted in FIGS. 1, 2, 3, 6, and 34, which represent the preferred embodiment of the present invention for a specific kit activity. The module 100 of modular kit 10 includes an upper section in the form of a plastic templates 20 having a plurality of openings which are provided to accept various electronic components located on the circuit board 60. These openings include circular hole openings 22ta, 22tb, 22tc, and 22td for indicator lights 62a, 62b, 62c, and 62d; a rectangular cut-out opening 24t for an integrated circuit and holder component 50; and rectangular cut-out openings 26t, 28t, and 30t for the terminal block connectors 66, 68, and 70 located on circuit board 60. The templates 20 also includes four hole openings 32ta, 32tb, 32tc, and 32td for four hex bolts 34a, 34b, 34c, and 34d that are contained within the four long and short plastic cylindrical support braces 36a, 36b, 36c, and 36d and 86a, 86b, 86c, and 86d, which separates templates 20 from board 60 and from ground plate 80. The hex bolts 34 and support braces 36 and 86 also give module 100 its rigid structural integrity, as depicted in FIG. 1 of the drawings. According to the function activity of the particular module 100, the various openings of 22t, 24t, 26t, 27t, 28t, 29t, and 30t may be located in different geographical positions, as shown by other templates 20 in FIGS. 5, 7, 9, 11, 13, and 15. The templates 20 can be made of plastic FOREX or PVC materials or made from a lightweight metal, such as aluminum. The overall dimensions of the templates 20 are 55 by 55 mm in length and width and 2 mm in thickness.

Self-adhesive plastic colored labels 40, as depicted in FIGS. 6, 8, 10, 12, 14, and 16, show the printed integrated circuit functional symbols or indicia 42, which clearly indicates and identifies the functions of module 100. The label 40 contains the same hole openings corresponding to templates 20, having circular openings 221a, 221b, 221c, and 221d for the indicator lights 62, a rectangular opening 241 for the integrated circuit 50, rectangular openings 261, 271, 281, 291, and 301 for the terminal block connectors 66, 68, 70, 76, 78, and 79 and hole openings 321a, 321b, 321c, and 321d for hex bolts 34. The self-adhesive label 40 is permanently affixed to the templates 20 and is aligned to match the various openings on templates 20, as shown in FIG. 1.

The circuit boards 60 of modules 100 contain the passive and active electronic components which provide for the functional aspects of that module 100 for a given activity. The circuit board 60 includes various component parts, such as indicator lights 62; an integrated circuit support holder 64 for receiving integrated circuit 50; terminal block connectors 66, 68 and 70; and the appropriate circuit wiring 74 for that circuit board function, such as resistors 74. (See FIG. 1.) The circuit holder 64 is centrally located on board 60, such that holder 64 enables various integrated circuits 200 to be installed and removed without disassembling the module 100. The terminal blocks 66, 68, and 70 are located on the perimeter edges of the circuit board 60. The terminal blocks have the connector points located on the sides of the blocks and, as explained more fully below, are used for making electrical connections to power sources, motors, and other modules.

Terminal blocks 66, 68, 70, 76, 78, and 79 each have a different number of connector points (depending upon the module 100 used), such that block 66 has two; block 68 has four; block 70 has eight; block 76 has three; block 78 has five; and block 79 has twenty-four, as depicted in FIGS. 17 through 23, 25, and 26.

A plastic counter top and ground plate 80 is placed under the circuit board module 60 and is kept separated by short plastic support braces 86a, 86b, 86c, and 86d. Plate 80 protects the various boards 60 from moisture, dust, and the like. The ground plate 80 also has hole openings 82a, 82b, 82c, and 82d for the four hex bolts 34a, 34b, 34c, and 34d. Plate 80 is held in place by four hex nuts 38a, 38b, 38c, and 38d, which give the modules 100 a rigid structure, as shown in FIG. 2.

Figure 25:
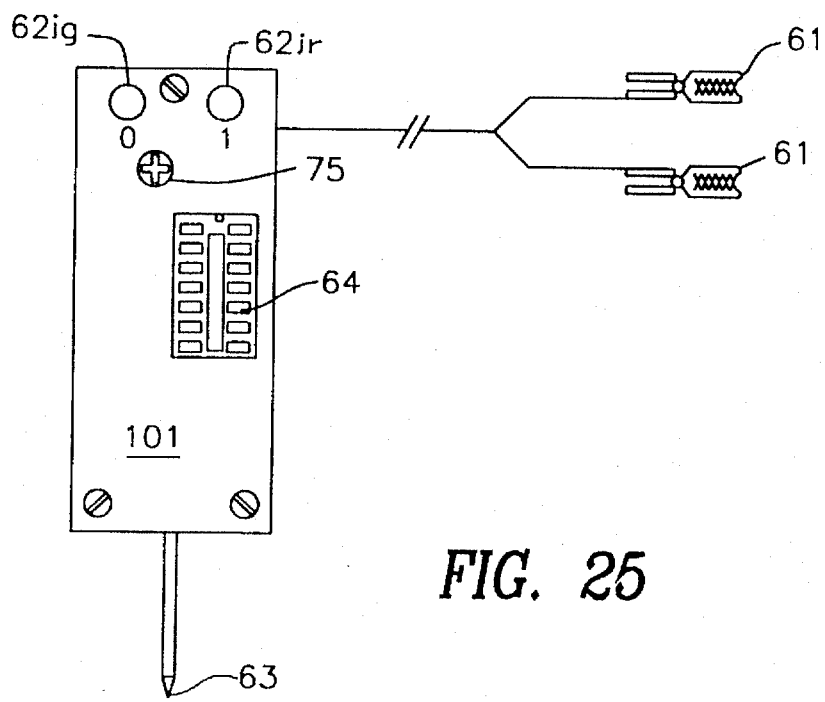
FIG. 25 is a top plan view of module No. 1 showing the configuration of the logic probe and component parts thereon.
Figure 27:
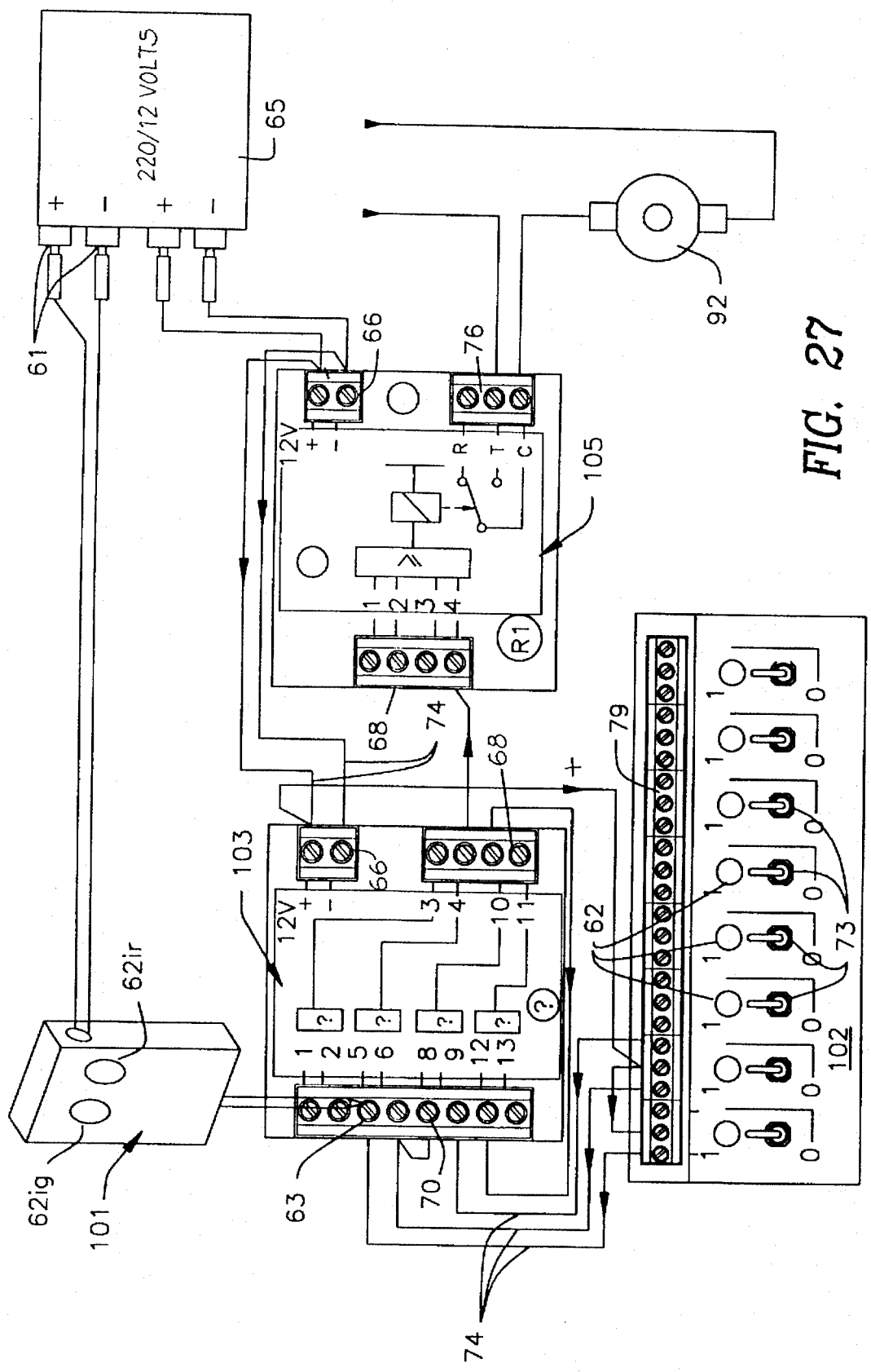
FIG. 27 is a schematic representation showing utilization of the logic probe of FIG. 25 with an electrical diagram and logigram of a specific application for controlling a motor.

The kit 10 contains several basic modules 100 for electronically controlling for the various applications. The functions of these principal modules 100 are summarized in Table 1 and are described as follows:

Module No. 1, as depicted in FIG. 25, shows the logic level probe 101 having probe connectors 61, a pair of indicator lights 62ir and 62ig, a probe touch tip 63, an integrated circuit holder 64, and an adjustment control knob 75. The probe 101 is used for checking the logic conditions of a specific activity, such as the presence or absence of power to a given board circuit 60. Probe 101 receives an integrated circuit (CD4011) 211 (FIG. 32) in holder 64. This probe 101 is capable of controlling the logic levels "1 and 0," as well as finding poor electrical connections of board wiring 74, as shown in FIG. 27.

Figure 26:
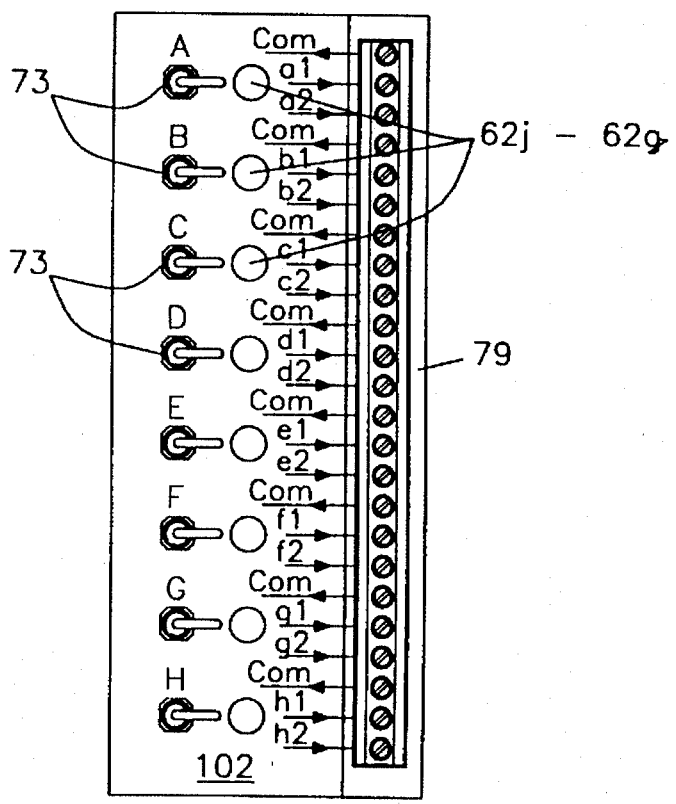
FIG. 26 is a top plan view of module No. 2 showing the configuration of the simulation interface circuit board having a plurality of sensing switches and lights.

Module No. 2, as shown in FIG. 26, provides for an input interface module 102 having a plurality of sensor switches 73A to 73H, indicator lights 62j to 62q, and a terminal block 79 with twenty-four connector points. This input interface module 102 is used for simulation and the adjustment of a given control activity and also for checking circuit wiring 74 and checking electrical wiring diagram. In order to achieve the study of the electrical diagrams and the checking out of the module wiring 74, the interface module 102 is equipped with eight sensor switches 73A to 73H, to allow visualizing the logic state through indicator lights 62j to 62q, as depicted in FIG. 27. This module 102 replaces temporarily the use of sensors, such as an optical sensor, by manually adjusting a given control.

Figure 18:
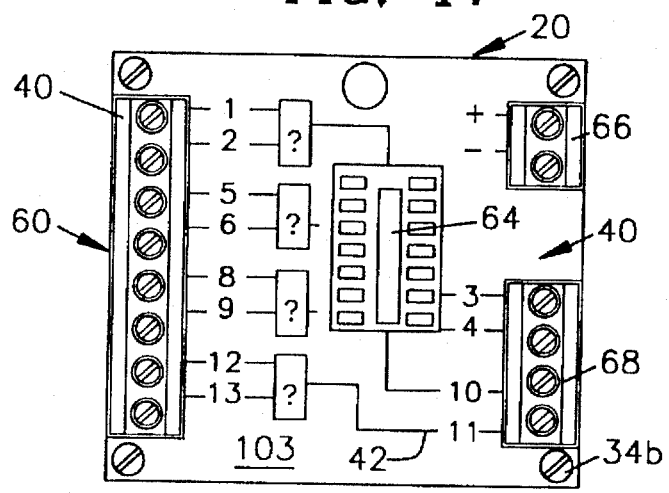
FIG. 18 is a top plan view of module No. 3 showing the configuration of the circuits and component parts thereon.

Module No. 3, as shown in FIG. 18, provides a basic logic module 103 having an integrated circuit support holder 64 and terminal blocks 66, 68, and 70. This logic module 103 is used for processing information and can accept on its holder 64 various integrated circuits being CD4001, designated as 201; CD4011, designated as 211; CD4081, designated as 281; CD4071, designated as 271; CD4093, designated as 293; CD4077, designated as 277; and CD4070, designated as 270. (See FIGS. 1, 3, 4, and 32.)

Figure 17:
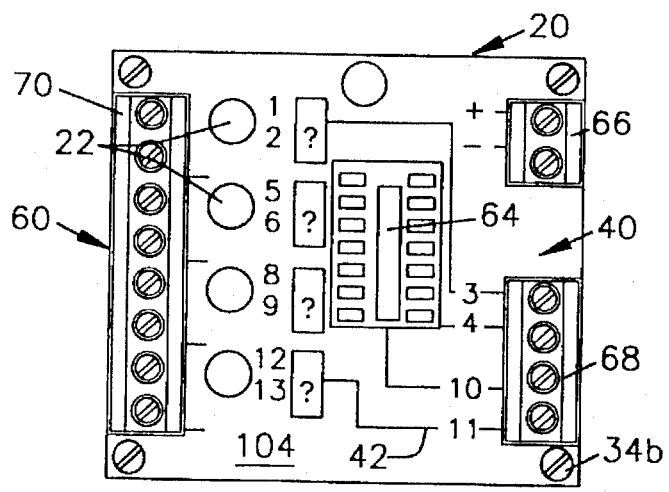
FIG. 17 is a top plan view of module No. 4 showing the configuration of the circuit board having 4 indicator lights.

Model No. 4, as shown in FIG. 17, provides an input interface and sequential function logic board 104 having four indicator lights 62, a support holder 64, and terminal blocks 66, 68, and 70. This sequential logic module 104 is also used for processing information in a sequential manner and can also accept on its holder 64 the same integrated circuits as module 103, being the integrated circuits 201, 211, 281, 271, 293, 277, and 270, as listed above.

Figure 21:
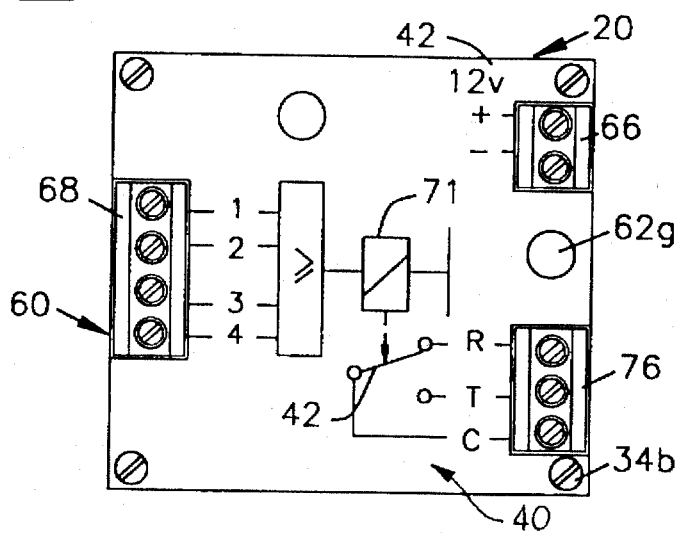
FIG. 21 is a top plan view of module No. 5 showing the configuration of the circuits and component parts thereon.

Module No. 5, as depicted in FIG. 21, provides a relay output interface module 105 having an indicator light 62g, terminal blocks 66, 68, and 76, and a relay component 71. This output interface module 105 is used for controlling the functions of motors, lamps, and the like. The board 105 is equipped with a National HB1-c.c. 12 V, 1 A/125 V-2A/30 c.c. type relay.

Figure 19:
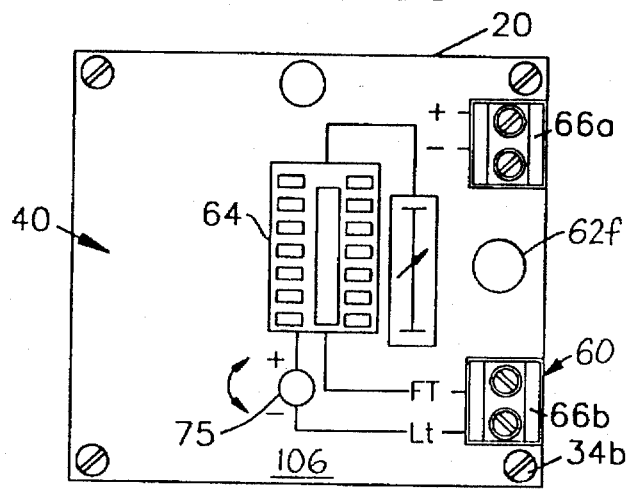
FIG. 19 is a top plan view of module No. 6 showing the configuration of the circuits and component parts thereon.

Module No. 6, as shown in FIG. 19, provides a time-delay module 106 having an indicator light 62f, a support holder 64, two terminal blocks 66a and 66b, and an adjustment control 75. This module 106 can accept on its holder 64 the integrated circuit (CD4001) 201, which gives an output delivery of movement for 0.5 seconds. The module 106 is adjustable from 0.5 to 90 seconds and works as a delaying function activity for a given sequence.

Figure 20:
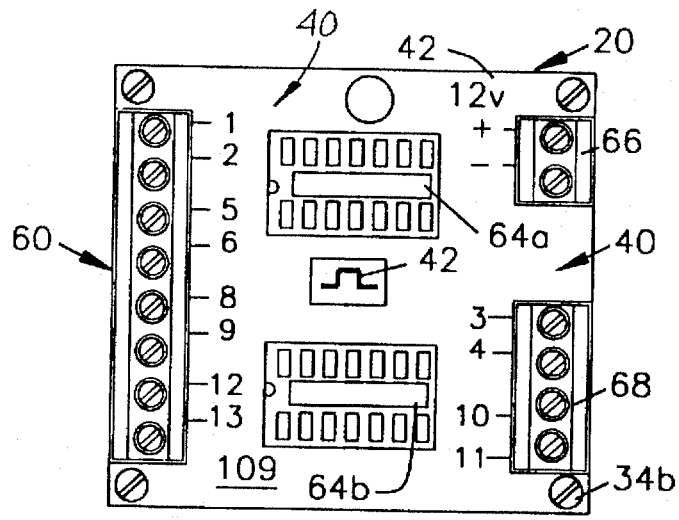
FIG. 20 is a top plan view of module No. 9 showing the configuration of the circuits and component parts thereon.

Module No. 9, as shown in FIG. 20, provides a module 109 equipped with up to four monostable oscillators (not shown) and having two support holders 64a and 64b and three terminal blocks 66, 68, and 70. This module 109 is used for transforming a continuous signal into an impulsion or mechanical movement activity. Module 109 can accept on its holders 64a and 64b two integrated circuits (CD4001) 201.

Module No. 11, as depicted in FIG. 22, provides a binary counter digital module 111 having a digital display 62h, a support holder 64, and terminal blocks 66, 68, and 78. This module 111 is used for counting objects or to control the movements of a mobile entity. It is also an intermediate counter with preselection. Module No. 11, as further depicted in FIG. 23, provides a binary countdown digital module 111 used as a countdown counter.

FIG. 24 shows a Table 112 having a binary code matrix. The result of counting or a countdown is shown on the retained output column labeled R provided by the binary code matrix columns D, C, B, and A.

Figure 4:
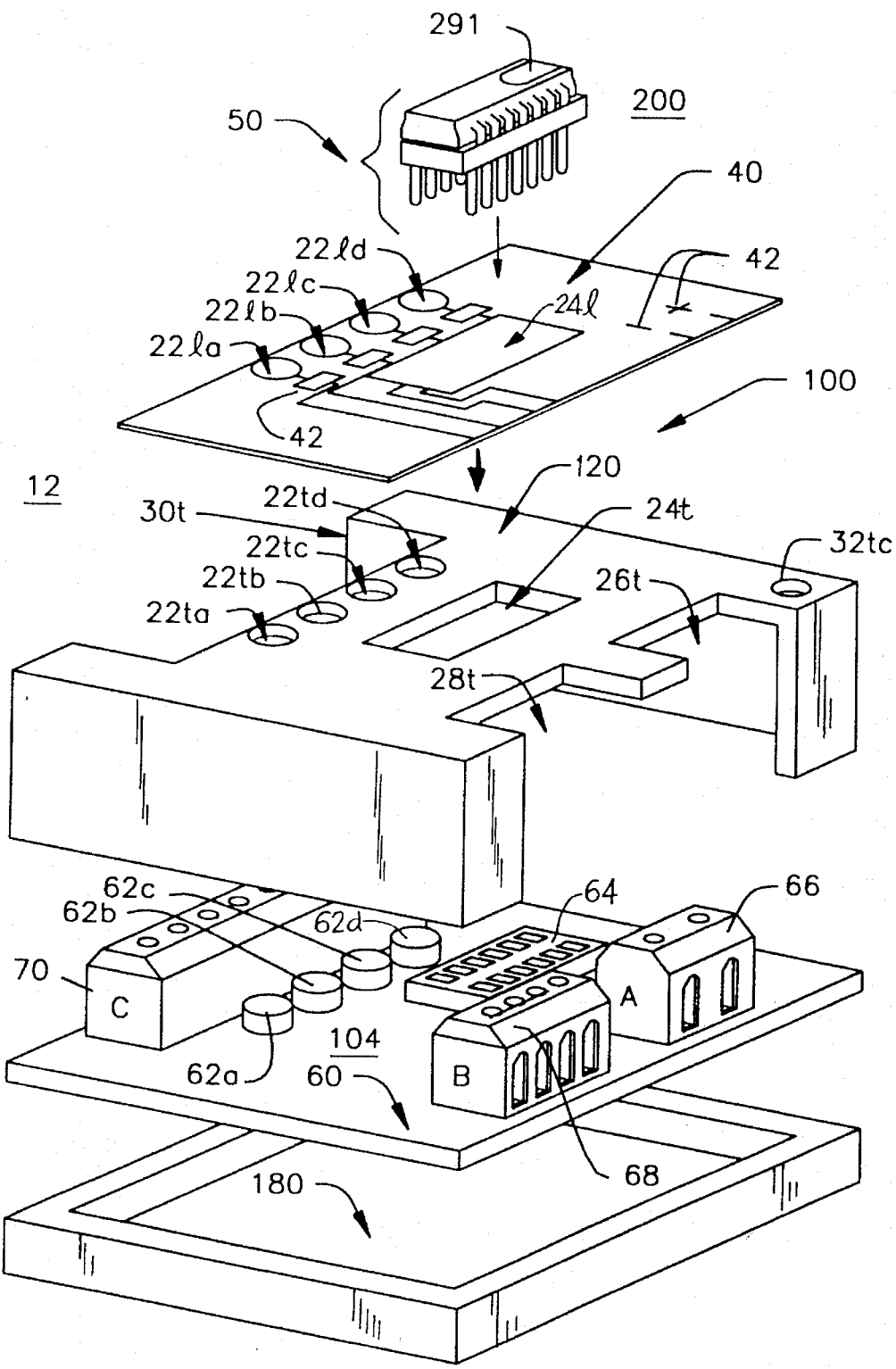
FIG. 4 is an exploded perspective view of a second embodiment showing the primary components of an electronic control module.
Figures 5, 6:
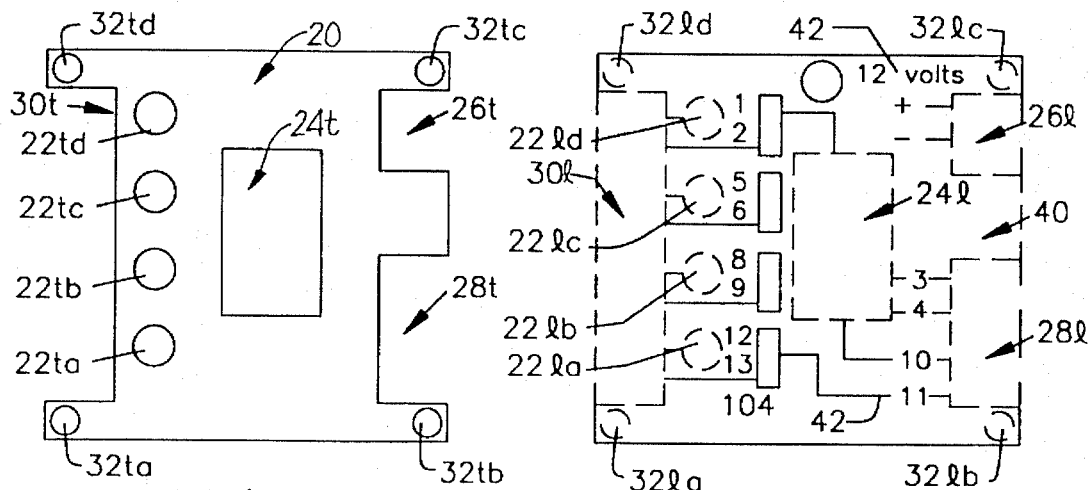
FIG. 5 is a top plan view of the plastic template showing the cut-outs for receiving the electrical connections of the terminal blocks of module No. 4.
FIG. 6 is a top plan view of the self-adhesive plastic colored label showing the printed integrated circuit symbols of module No. 4 on it, such that this label is to be used in conjunction with the template of FIG. 5.
Figures 7, 8:
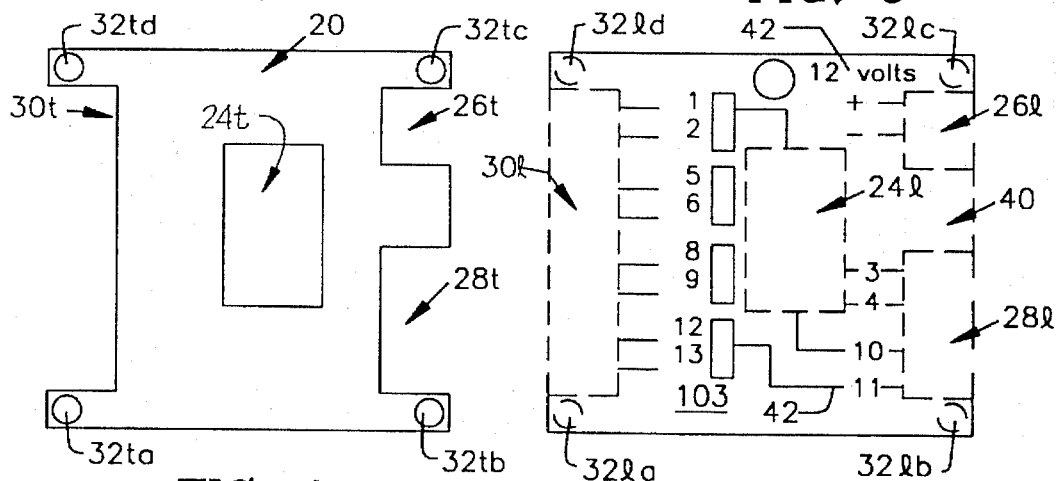
FIG. 7 is a top plan view of the plastic template showing the cut-outs for receiving the electrical connections of the terminal blocks of module No. 3.
FIG. 8 is a top plan view of the plastic label showing the printed integrated circuit symbols of module No. 3 on it, such that this label is to be used in conjunction with the template of FIG. 7.
Figures 9, 10:
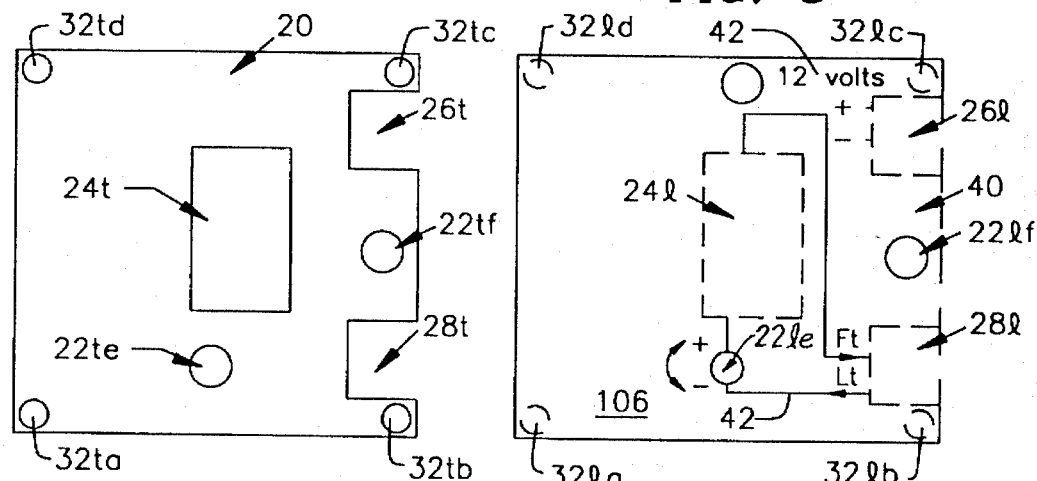
FIG. 9 is a top plan view of the plastic template showing the cut-outs for receiving the electrical connections of the terminal blocks of module No. 6.
FIG. 10 is a top plan view of the plastic label showing the printed integrated circuit symbols of module No. 6 on it, such that this label is to be used in conjunction with the template of FIG. 9.
Figures 11, 12:
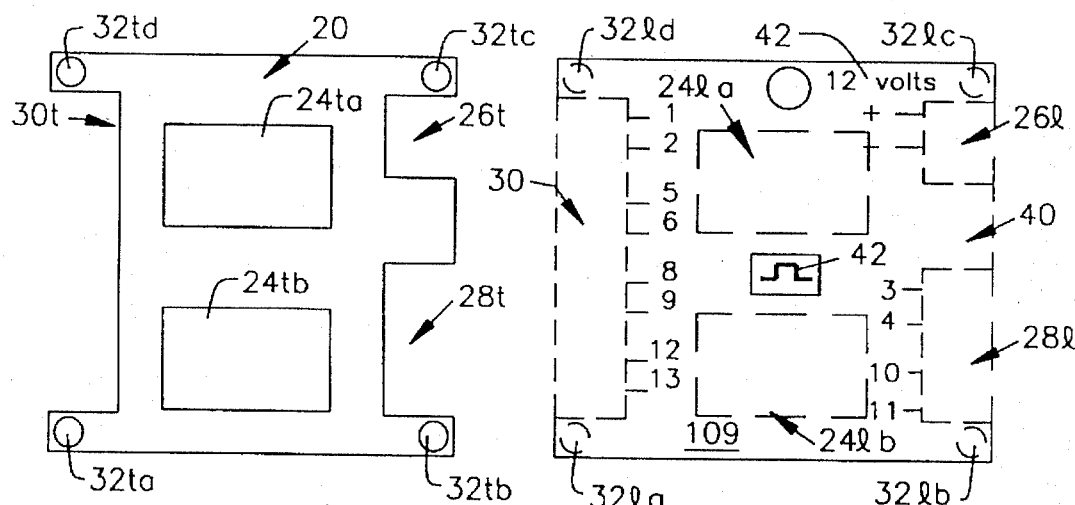
FIG. 11 is a top plan view of the plastic template showing the cut-outs for receiving the electrical connections of the terminal blocks of module No. 9.
FIG. 12 is a top plan view of the plastic label showing the printed integrated circuit symbols of module No. 9 on it, such that this label is to be used in conjunction with the template of FIG. 11.
Figures 13, 14:
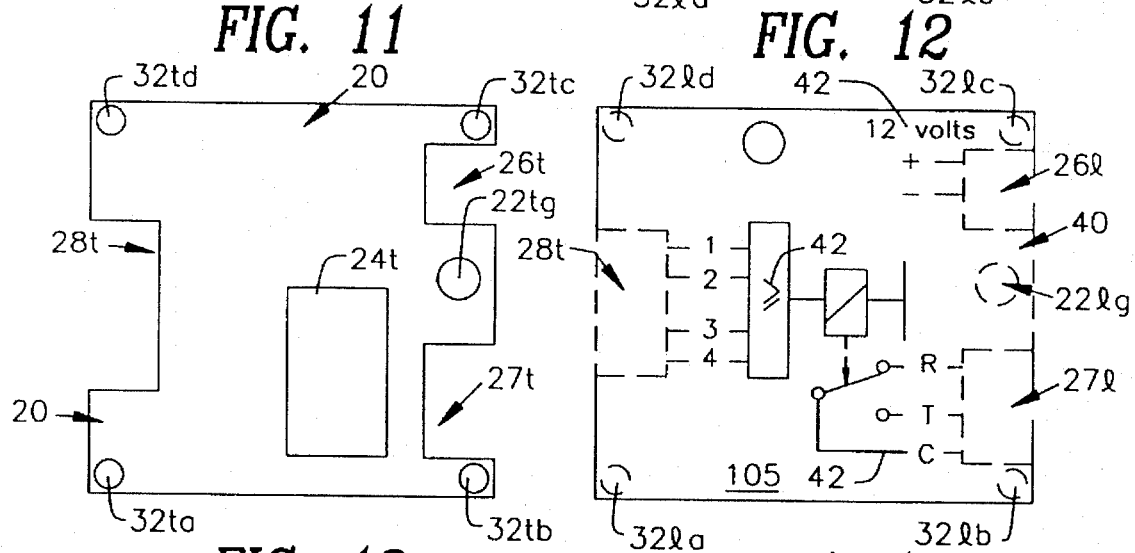
FIG. 13 is a top plan view of the plastic template showing the cut-outs for receiving the electrical connections of the terminal blocks of module No. 5.
FIG. 14 is a top plan view of the plastic label showing the printed integrated circuit symbols of module No. 5 on it, such that this label is to be used in conjunction with the template of FIG. 13.
Figures 15, 16:
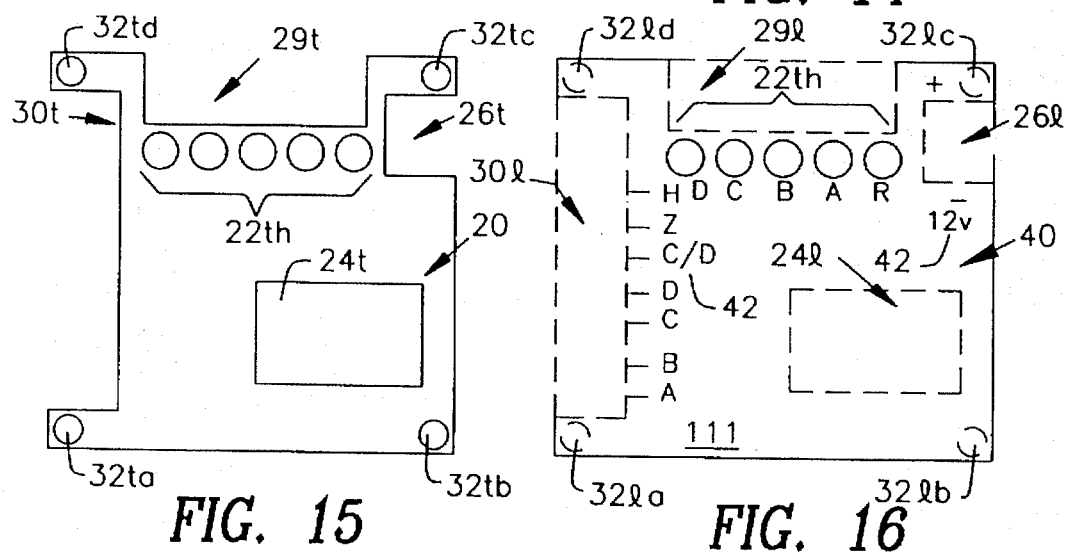
FIG. 15 is a top plan view of the plastic template showing the cut-outs for receiving the electrical connections of the terminal blocks of module No. 11.
FIG. 16 is a top plan view of the self-adhesive plastic colored label showing the printed integrated circuit symbols of module No. 11 on it, such that this label is to be used in conjunction with the template of FIG. 15.

There is a second embodiment of the modular construction kit 10 labeled as 12, depicted in FIG. 4. The mechanical principal of assembly is the same for all of the modules 100, but in FIG. 4, the templates 120 and ground plate 180 are different and appear in the form of small plastic molded cases. In all other respects, the second embodiment is structurally and functionally the same as the preferred embodiment of modules 100.

TABLE 1

A FUNCTION UTILIZATION CHART

| Module Model Number | Type of Function for Module | Description of Function Activity for Module |
| --- | --- | --- |
| Module No. 1 | Checks logic conditions | Logic probe capable of controlling the logic levels "1 and 0" and checking of board wiring connections. |
| Module No. 2 | Simulation interface | Board equipped with sensor switches and indicator lights for simulation and the adjustment of a control. |
| Module No. 3 | Programmed logic functions | Processes information. |
| Module No. 4 | Logic function and indicator lights | Processes information in a sequential manner. |
| Module No. 5 | Control action function | Board controls functions of motors, lamps, electromagnets, solenoid valve pumps, etc. |
| Module No. 6 | Delayed function | Provides a delaying function activity for a given sequence of action. |
| Module No. 9 | Controls movement | Monostable oscillator to transform a continuous signal into mechanical movement. |
| Module No. 11 | Counting function up/down | A counter to count objects and/or to control the movements of a mobile vehicle and a countdown of time in order to start an activity or movement. |

TABLE 1-continued

A FUNCTION UTILIZATION CHART

| Module Model Number | Type of Function for Module | Description of Function Activity for Module |
|---|---|---|
| Module No. 15 | Simulation interface function | Same use as Module No. 2, except it is equipped with fewer sensor switches and indicator lights. |

APPLICATIONS AND OPERATIONS OF THE PRESENT INVENTION

In using the modular construction kit 10 in conjunction with other compatible toys (i.e., scale models of a drawbridge, automatic vehicle gate control), the kit 10 has a self-training utilization guidebook which explains the procedures of implementation of the various modules 100. The guidebook has data sheets proposing electrical diagram suggestions for the various electronic control activities which will help the child in the selection of the proper modules 100 which the child will have to acquire to automate the mobile elements of the scale model. As explained above, the kit 10 contains a series of modules 100 that are designated 101, 102, 103, 104, 105, 106, 109, 111, 112, and 115, and their functional activity is summarized in Table 1.

The kit 10 has a high degree of reliability for the various modules 100, such that the modules are permanently reusable for various applications. The modules 100 do not require any maintenance and have minimal breakdown risk. At all times, in order to modify an electronic control function, the user can add or withdraw a given module 100. The user can easily achieve different combinations of sub-assemblies of electronic controls by using different combinations of modules 100, which can then be connected with either simple or complex electronic controls for various functions or mechanical movements.

When in use, the kit 10 provides the child with a learning experience and the ability to do board mapping and function logigrams in an easy manner. This is possible because there are a number of modules 100 which are numbered, the identification symbols 42 are printed on the templates 20, and the integrated circuits 200, which perform the various functions, are interchangeable in the various modules. This makes it possible to achieve many combinations of electronic controls and many combinations of modular subassemblies. The child can play with the modular construction kit 10 without having any electronic knowledge, because it is based on a well-known concept which allows the use of function blocks according to an electrical diagram, a logigram, or an icon. As stated above, Table 1 shows a function utilization chart that provides the module number, the function, and a description of the function activity for that module.

Data acquisition is accomplished by all of the logic modules which are designed for processing information from electromechanical or electronic sensors. These modules 100, in using electromechanical or electronic sensors, can be equipped with push buttons, switches, miniature position sensors (microcontact), LDR optical cells, infrared diode optical sensors, pressure probes, temperature probes (thermistor), water level probes, optocoupler diodes (optical coder), and/or potentiometers for servo mechanisms. All of these aforementioned components help the user to achieve a more realistic model of the activity involved. The analog modules 100 are designed for processing analog functions by physical parameter size conversion which measures the intensity of a light source, levels of temperature, pressure and liquids, and the like.

An example of the modular construction kit 10 in use is depicted in FIG. 27. The modules 102, 103, and 105 are connected together by wires 74 and control the motor 92. Power is supplied by power supply 65 to the modules 102, 103, and 105, and the modules are interconnected by terminal blocks 66, 68, 70, 76, and 79. Switches 73 on module 102 are used to control the circuit and motor 92.

After the modules have been connected, the logic probe module 101 is placed in contact with the terminal blocks 66, 68, and 70 of modules 102, 103, and 105 to test them. The logic probe module 101 has a low-level function (logic level 0), which provides for the green indicator light 62$ig$ to be ON while the red indicator light 62$ir$ is to be OFF, and probe 101 has a high-level function (logic level 1) which provides for the red indicator light 62$ir$ to be ON while the green indicator light 62$ig$ is to be OFF. When probe 101 shows both the red and green indicator lights 62$ig$ and 62$ir$ to be OFF, this indicates there is a lack of power to the board modules 60 being used.

This latter function of checking for the presence of power by using the probe 101 makes it possible to check the continuity of the connections 74 between the exit of a logic door and the input of another logic door. For example, if a wire 74 is cut, neither level "1" nor level "0" will be activated, and neither one of the indicator lights 62$ig$ and 62$ir$ will be activated. Thus, both indicator lights 62$ig$ and 62$ir$ will be off, telling the user to check the wires and the connections.

As shown in FIG. 27, the polarity of the power supply 65 of the board interfaces 60 is positive, and logic functions are also positive. Thus, the information supplied through switches or electromechanical sensors makes it possible to bring the logic door inputs to a logic level 1 having the red indicator light 62$ir$ ON, which indicates a presence of power from power supply 65. When a switch or a sensor does not supply a door, so that both red and green indicator lights 62$ir$ and 62$ig$ are OFF, this indicates a lack of power to the circuitry.

Figure 28:
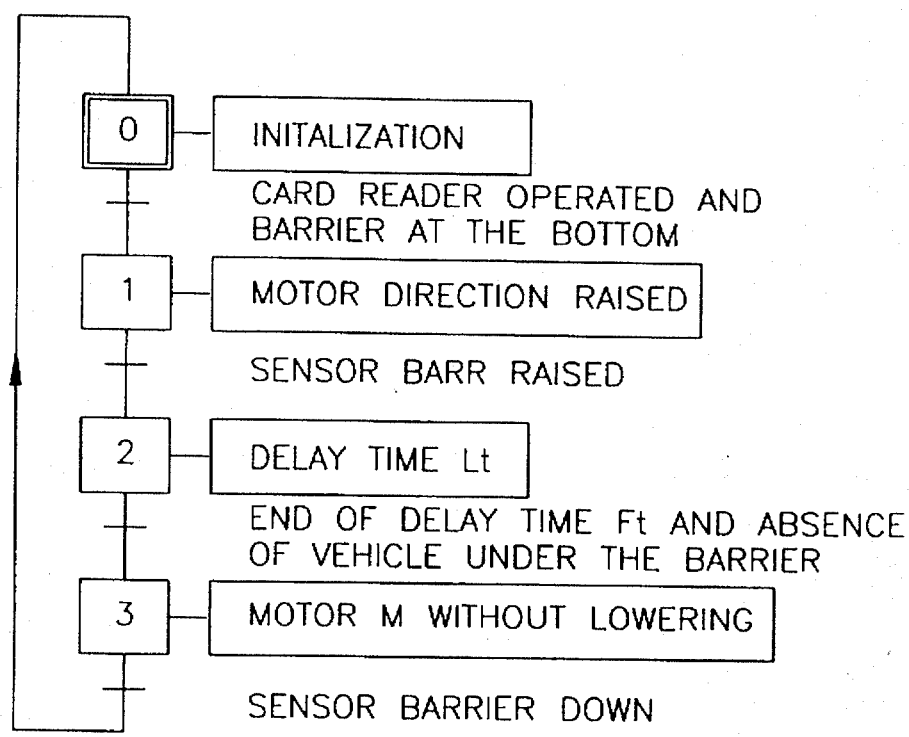
FIG. 28 is a block diagram showing the operative logic of a control gate for a scale model parking lot safety gate device of FIG. 29.
Figure 29:
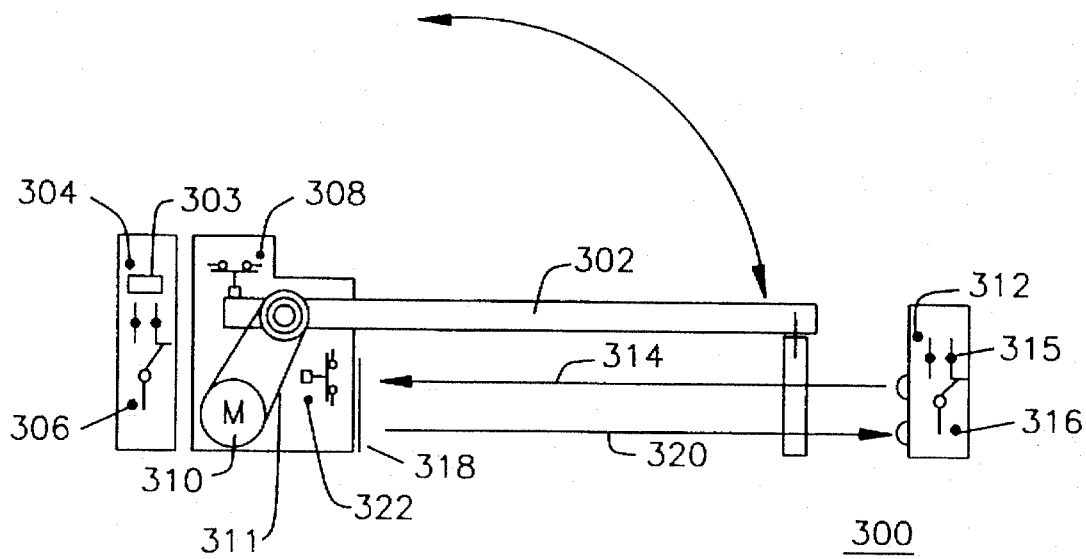
FIG. 29 is a side elevational view of a scale model parking lot safety gate for automobiles showing the movement of the control gate.
Figure 30:
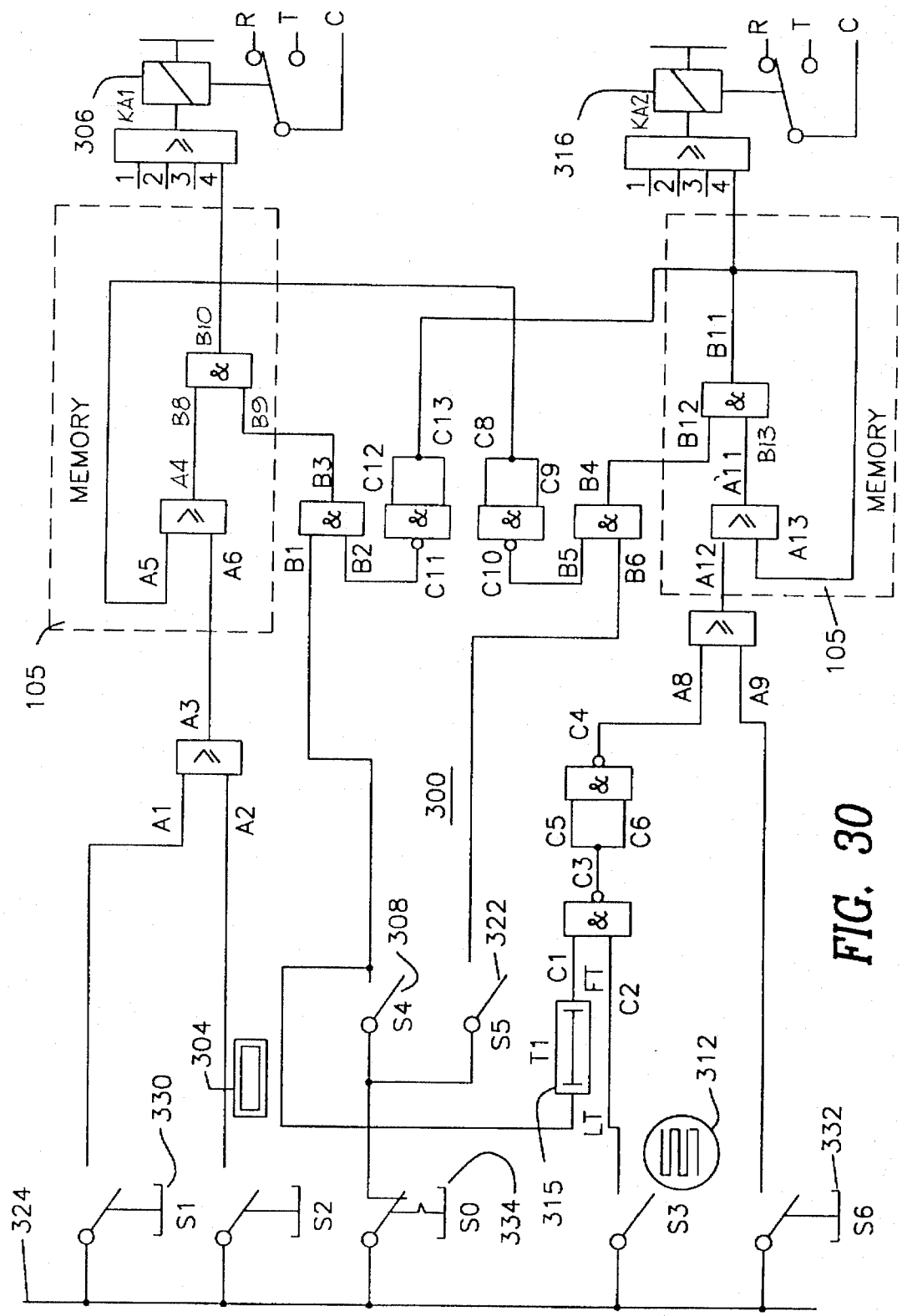
FIG. 30 is an electrical schematic diagram showing the electrical wiring scheme of FIG. 29.

Another example of the modular construction kit 10 in use is shown in FIGS. 28, 29, and 30, which depicts the control of a scale model of an automatic vehicle control gate system 300. The automatic gate system 300 checks the access to a parking lot for vehicles, where only certain drivers holding a magnetic card 303 are authorized to control the opening of the barrier gate 302. This description of the above activity is provided in graphic form by using a standardized functional diagram named GRAFCET, as shown in FIG. 28.

In the automatic system 300, as shown in FIG. 29, there is an electric motor 310 having a pulley belt 311 that is able to move in two directions of operation, for raising or lowering of the barrier gate 302. The scale model 300 also includes a magnetic card LCM reader or sensor 304 for reading magnetic card 303 which controls the opening of the barrier gate 302; one electromechanical sensor 322 positioned at the end of travel when the gate is open and sensor 308 at the end of travel when the gate is closed; a time-delay device 315 which delays the lowering of the gate; and an optical sensor 312 and reflector 318 which prohibit the lowering of the gate 302 if a vehicle is still present under the gate after the elapsed time.

The electrical diagram, as shown in FIG. 30, shows the automatic gate control system 300 having a power source 324; switch S1 for raising the gate by push button (which manually resets the control gate); switch S2 for lowering the gate; magnetic card LCM reader 304; optical sensor/vehicle presence sensor 312; S4 for the end of travel to raise the gate; S5 for the end of travel to lower the gate; S6 for lowering the gate by push button, which manually resets the control gate; S0 is a stop push button and; T1 is a time-delay device. The output assignments, as shown in FIG. 30, are relays KA1 and KA2, which use two modules 105 for controlling the motor 310 that controls the raising and lowering of gate 302. The control relay KA1 is for raising gate 302, and the control relay KA2 is for lowering gate 302. To achieve the other controls for the automatic gate system 300, the user would also include three modules 103, each having an integrated circuit. The first board has an integrated circuit (4071) 271, the second board has an integrated circuit (4081) 281, and the third board has an integrated circuit (4011) 211.

Commercially, the modules 100 are to be packaged in singular units in a transparent plastic blister pack 98, as shown in FIGS. 31 and 32, which makes the modules more easily identifiable at the time of their purchase. The technical selections of the various sensors are independent from the modules, as they remain up to the application and need of the user, such that the sensors, electric motors, and the scale models are to be sold separately and are not necessarily associated with the modular kit 10.

According to the present invention, there are several modules that are particularly intended for the electronic control of the various scale models, construction models, and other technical and scientific construction kits that use a power source of 12 volts from batteries or house current that will not be harmful to a child, upon completion of the circuit wiring in order to operate the toy. The user may also use these modules 100 for other applications than scientific toys.

FIG. 31 shows a blister pack 98 having a logic module 105 with an indicator light 62g. This board has an output function with relays intended for the control of a small electric motor or any other actuator.

FIG. 32 shows a blister pack 98 having a logic module 104 with indicator lights 68 and also with four integrated circuits 201, 211, 281, and 271. This board is used to achieve combinational or sequential logic functions.

As all of the modules 100 are compatible, they can be selected from a catalog specifying their functions. As shown in a further example, as depicted in FIG. 33, it provides for a scale model of an automatic drawbridge 400 which comes from a LEGO toy.

Figure 35:
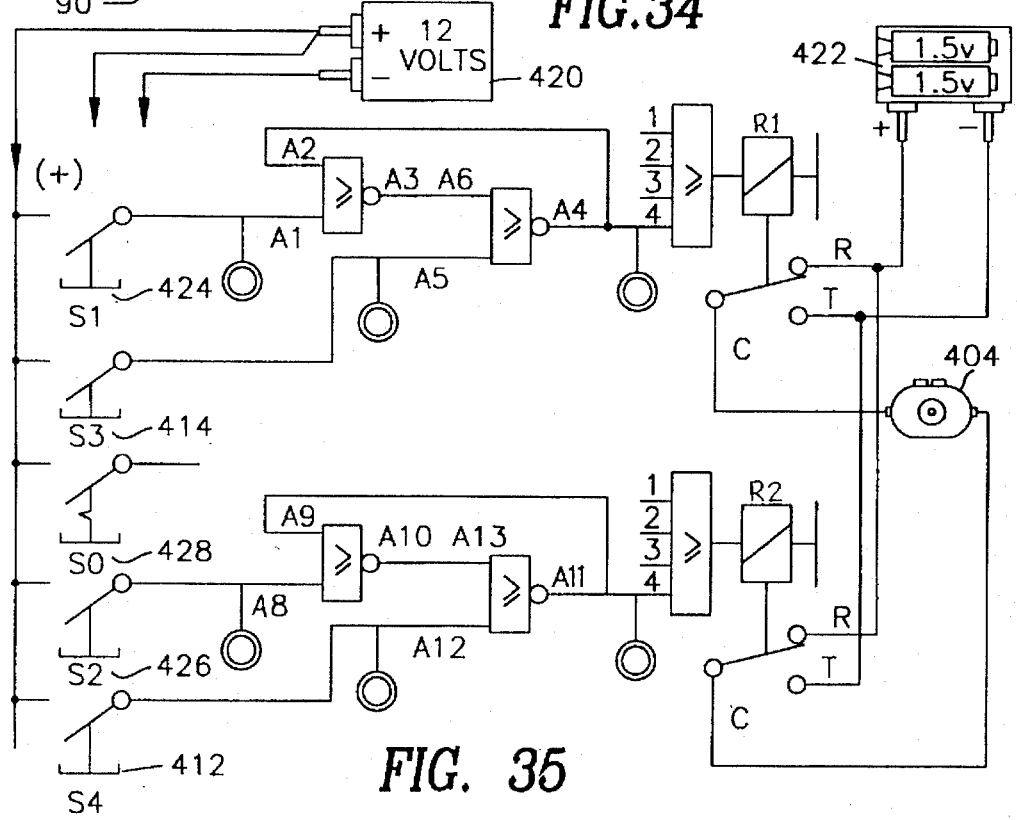
FIG. 35 is an electrical schematic diagram showing the electrical wiring scheme of FIG. 33.

The drawbridge 400 automatically displaces the bridge member 402 to the right 416 and then is returned to the left 418 by an electric motor 404. To control the electric motor 404, the user provides a module 104 and two modules 105. The user installs two position sensors 412 and 414 at the ends of the bridge structure 410 in order to stop its displacement to the right 416 or to the left 418. The user then can proceed to the wiring, as shown by FIG. 35, of the electrical logic diagram for the automated drawbridge scale model 400. The drawbridge 400 includes a bridge member 402, an electric motor 404, a pulley 406, a gear transmission 408, a bridge structure 410, and microcontacts 412 and 414 to stop displacement at positions 416 and 418.

Figure 34:
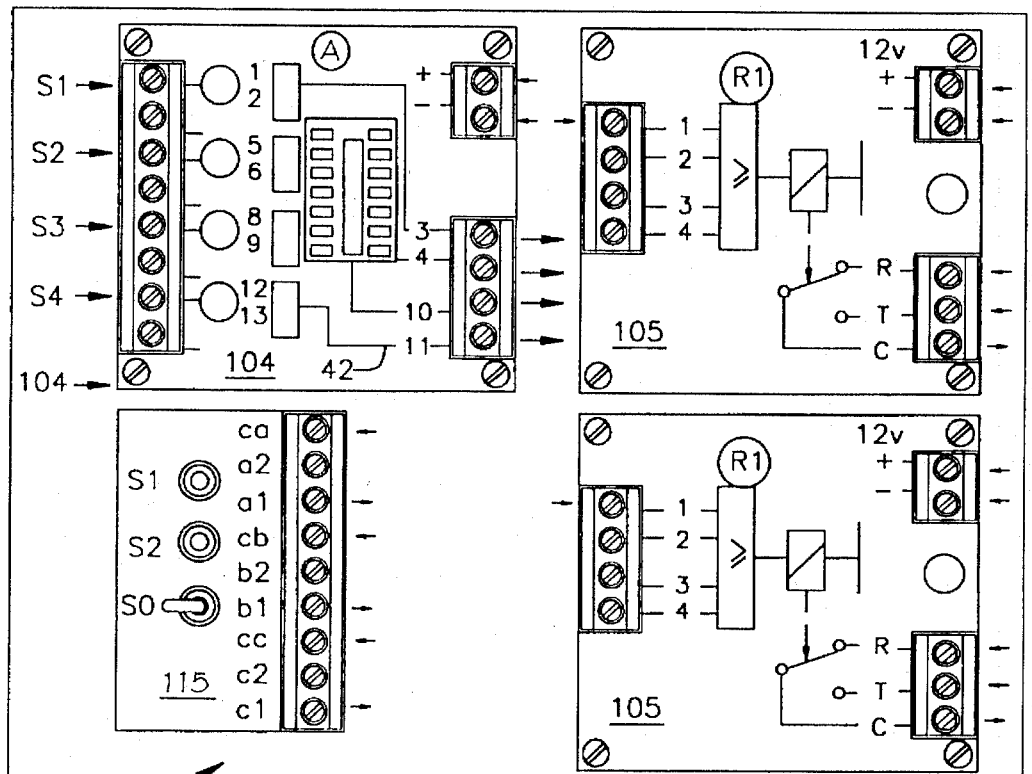
FIG. 34 is a top plan view of the plate board holder showing various modules being held and prepared for circuit wiring for FIG. 32.

To achieve the wiring 74 for the control of drawbridge 400, the user proceeds to place one module 104, two modules 105, and one module 115 on a board holder 90 for the completion of the hard wiring of circuitry, as shown in FIGS. 34 and 35.

The electrical diagram, represented by FIG. 35, shows the principal circuit wiring 74 of the various sensors 412, 414; modules 104, 105; power supplies 420, 422; and the electric motor 404. The electrical diagram also shows manual resetting controls 424, 426, and a stop action switch 428. The use of the modules will supply all of the logic combinations necessary in playing with this drawbridge 400.

Advantages of the Present Invention

Accordingly, the primary advantage of the present invention is that it provides for a modular construction kit having electrical modular controls for controlling and/or building scale models, construction models, and for the use of breadboarding animation visuals for the play and learning skills of the children involved.

Another advantage of the present invention is that it provides for the utilization of current electronic technology for adaptation to a child's modular construction kit having electronic controls.

Another advantage of the present invention is that it provides for the use of logic modules that are designed for processing information data from sensors which are electromechanical and optoelectronic in use.

Another advantage of the present invention is that it provides for the use of analog modules that are designed for processing analog physical parameters, such as the intensity of a light source, temperature, pressure, liquids, potentiometer, etc.

Other advantages of the present invention are that it provides for the use of electronic modular control boards which are used for the sensing of power (presence or absence), sensor switches, and indicator lights for simulation and the adjustment of a control; combinational and sequential logic; time-filling devices; output relay interfaces for motors, lamps, pumps, etc., controlling; monostable oscillators to transform a continuous signal into movement; and digital control counters to count objects or to control movements of a mobile model.

Another advantage of the present invention is that it provides for a modular construction kit for a child to acquire a hands-on know-how and general knowledge by using high-performance logic control modules that are simple to use and learn from.

Another advantage of the present invention is that it provides for a modular construction kit having modular control boards that are reliable and permanently reusable for various applications.

Another advantage of the present invention is that it provides for a modular construction kit having modular control boards that have minimal breakdown risk and do not require any maintenance.

Another advantage of the present invention is that it provides for a modular construction kit having modular control boards which can be modified at all times to change an electric control by adding or withdrawing control boards.

Another advantage of the present invention is that it provides for a modular construction kit having modular control boards that can be used to form a plurality of subassemblies of electric controls and which can be used to make simple and/or complex electric controls for mechanical movement.

Another advantage of the present invention is that it provides for a modular construction kit having modular control boards which can be interactive with other types of construction kits, scale models, construction models, and the like.

Another advantage of the present invention is that it provides for a modular construction kit having a self-training utilization guide explaining the procedures of implementation of the boards with data sheets proposing diagram suggestions of electric control which will help the child in the selection of modules to automate the mobile elements of the model.

Another advantage of the present invention is that it provides for a modular construction kit capable of providing the controls for a variety of different scale models, construction models, and animation visuals of objects like a drawbridge, a railroad crossing guard, an automobile, a truck, a small robot, an elevator, an erection crane, and the like.

A further advantage of the present invention is that it provides for a modular construction kit capable of being upgraded to 30 different modules that are intended for the optimization of complex control circuits which increase the types of models that are constructed and controlled.

A still further advantage of the present invention is that it provides for a modular construction kit having electronic controls which can be mass produced in an automated and economical manner and are relatively inexpensive.

A latitude of modification, change, and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein.

What is claimed is:

1. A kit for controlling mechanical and electrical components, comprising:

a) a plurality of function modules, wherein each function module includes a circuit board having one or more terminal connectors and one or more supports for receiving integrated circuits; a module cover having a plurality of openings for receiving said terminal connectors and for receiving said supports for said integrated circuits; and a ground plate connected to said circuit board;

b) a plurality of integrated circuits for connection to said supports in said function modules;

c) a switch module (102) having one or more control switches and one or more terminal connectors for connection to said plurality of function modules; and d) a testing module (101) for testing circuit wiring of said function modules and including a probe and one more electrical connectors.

2. A kit in accordance with claim 1, further including a support board for supporting and interconnecting said plurality of function modules and said switch module.

3. A kit in accordance with claim 1, further including a plurality of indicator lights on said function modules.

4. A kit in accordance with claim 1, wherein one or more of said function modules includes an adjustable control element.

5. A kit in accordance with claim 1, wherein one or more of said function modules includes one or more monostable oscillators.

6. A kit in accordance with claim 1, wherein one or more of said function modules includes one or more relays.

* * * * *